Figure 1:
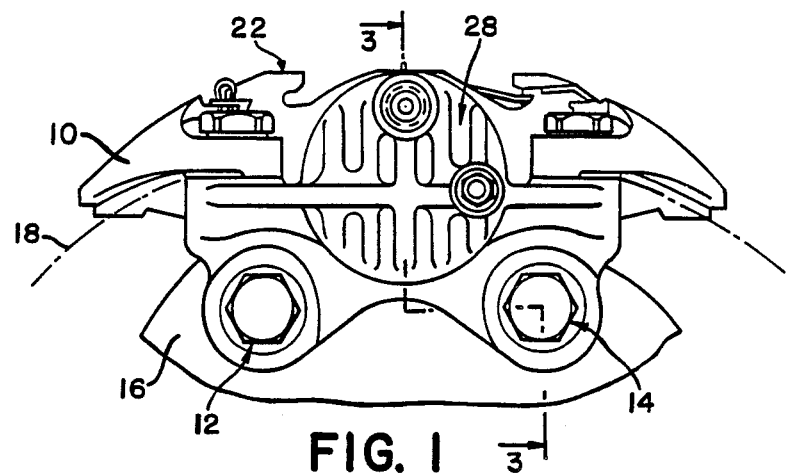

United States Patent [19]

Le Marchand

[11] Patent Number: 4,976,339
[45] Date of Patent: Dec. 11, 1990

[54] DISC BRAKE AND SUPPORT SYSTEM FOR SUCH A BRAKE

[75] Inventor: Claude Le Marchand, Domont, France

[73] Assignee: Bendix France, Drancy, France

[21] Appl. No.: 353,848

[22] Filed: May 17, 1989

[51] Int. Cl.$^5$ ............................................. F16D 65/06
[52] U.S. Cl. .................. 188/73.45; 188/73.39
[58] Field of Search ............... 188/73.35, 73.36, 73.37, 188/73.39, 73.44, 73.45, 206 A

[56] References Cited

U.S. PATENT DOCUMENTS

| | | | |
|---|---|---|---|
| 4,106,595 | 8/1978 | Kimura et al. | 188/73.3 |
| 4,334,599 | 6/1982 | Ritsema et al. | 188/73.45 |
| 4,372,428 | 2/1983 | Delaunay et al. | 188/73.45 X |
| 4,438,832 | 8/1984 | Nomura | 188/73.45 |
| 4,781,273 | 11/1988 | Fujinami | 188/73.45 X |

FOREIGN PATENT DOCUMENTS

| | | |
|---|---|---|
| 2329901 | 5/1977 | France . |
| 2441766 | 6/1980 | France . |
| 2046854 | 11/1980 | United Kingdom . |
| 2099524 | 12/1982 | United Kingdom . |

Primary Examiner—Duane A. Reger
Attorney, Agent, or Firm—Larry J. Palguta; Ken C. Decker

[57] ABSTRACT

The subject of the invention is a disc brake and support system for such a brake. The disc brake comprises a torque-supporting member (10), with which are associated actuation mechanism (26, 28) capable of urging at least one friction element (22, 24) against a rotating disc (18), the torque-supporting member being equipped with bores (32, 34) allowing it to slide respectively on a first column (12) located at the torque input and on a second column (14) located at the torque output in a direction substantially perpendicular to the plane of the rotating disc, these columns being fixed to a stationary support (16). According to the invention, the guide lengths of the torque-supporting member (10) on the first column (12) and on the second column (14), L and l respectively, are different. Also according to the invention, the play left between the first column (12) and the first bore (32) on the one hand and between the second column (14) and the second bore (34) on the other hand, $J_E$ and $J_S$ respectively, can be different.

8 Claims, 2 Drawing Sheets

DISC BRAKE AND SUPPORT SYSTEM FOR SUCH A BRAKE

The invention relates to a disc brake for a motor vehicle.

The invention relates more particularly to a disc brake comprising a torque-supporting member, with which are associated actuation means capable of urging at least one friction element against a rotating disc, the torque-supporting member being equipped with a first bore located at the torque input and with a second bore located at the torque output, allowing it to slide respectively on a first column located at the torque input and on a second column located at the torque output, in a direction substantially perpendicular to the plane of the rotating disc, these columns being fixed to a stationary support.

In this type of brake, it is necessary for the torque-supporting member to be movable on a stationary support in the direction perpendicular to the plane of the rotating disc, in order to allow for the wear of the friction elements, the actuation means then having a stroke increased by a value representing the wear of the friction element or friction elements.

The desired movability of the torque-supporting member in relation to the columns makes it necessary to provide some play between these components, allowing for the slight errors of parallel alignment of the columns which are always possible when the brake is mounted on a stationary support associated with a stationary part of the vehicle.

This results in the disadvantage of allowing the torque-supporting member to execute a rotational movement about an axis parallel to the plane of the rotating disc when the brake is actuated.

It follows from this that the wear of the friction elements is not uniform since for most of the time they have to work in the same direction, that is to say when the motor vehicle travels forwards and, during braking, stresses the torque-supporting member in a preferential direction. Thus, it is found, in a plane parallel to the axis of the rotating disc and containing the axis of the actuation means, that there is a bevelled wear of the friction elements, this being detrimental to their length of life.

When the vehicle travels in reverse and the driver brakes, the working conditions are reversed and have a negligible influence because they are much less frequent.

Various solutions have already been provided for this problem, but without giving full satisfaction. Thus, for example, U.S. Pat. No. 4,265,340 proposes interposing between the columns and the bores of the torque-supporting member which receives these columns sleeves of elastic material which are intended for improving the sliding of the torque-supporting member on the columns, but which still allow a rotational movement of the brake as a whole in relation to the columns.

To remedy the disadvantages mentioned above, the present invention provides a disc brake comprising a torque-supporting member, with which are associated actuation means capable of stressing at least one frictional element against a rotating disc, the torque supporting member being equipped with a first bore located at the torque input and with a second bore located at the torque output, allowing it to slide respectively on a first column located at the torque input and on a second column located at the torque output in a direction substantially perpendicular to the plane of the rotating disc, these columns being fixed to a stationary support, characterized in that the guide of the torque-supporting member on the first column is different from the guide of this torque-supporting member on the second column. In a first embodiment, the guide lengths of the torque-supporting member on the first column and on the second column, L and l respectively, are different. In a second embodiment, the play left between the first column and the first bore on the one hand and between the second column and the second bore on the other hand, $J_E$ and $J_S$ respectively, are different.

The present invention thus makes it possible to minimize the rotation of the torque-supporting member in relation to the columns, while at the same time leaving it free in terms of translational movement on these, and therefore better to distribute the wear of the friction elements, thus ensuring that they have greater efficiency over a longer lifetime.

Figure 2:
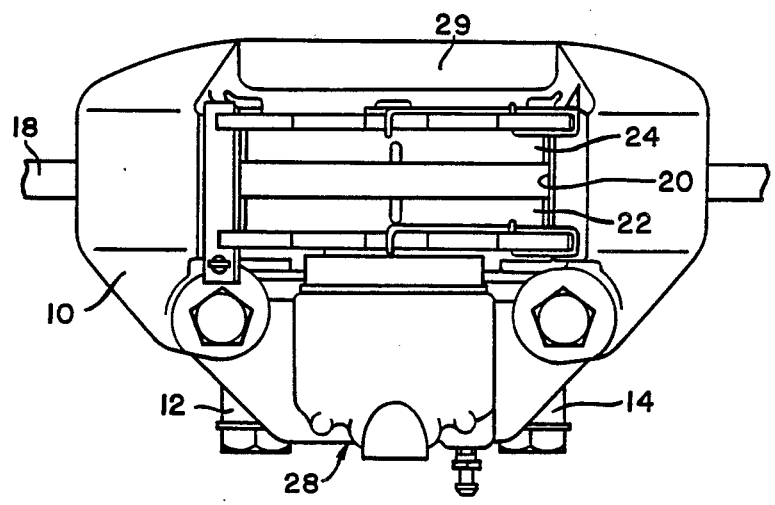
Figure 3:
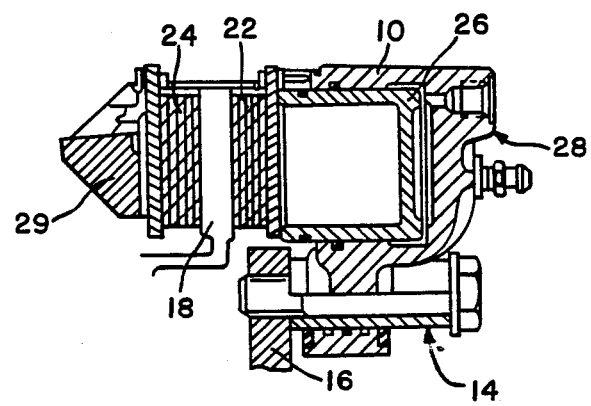
Figure 4:
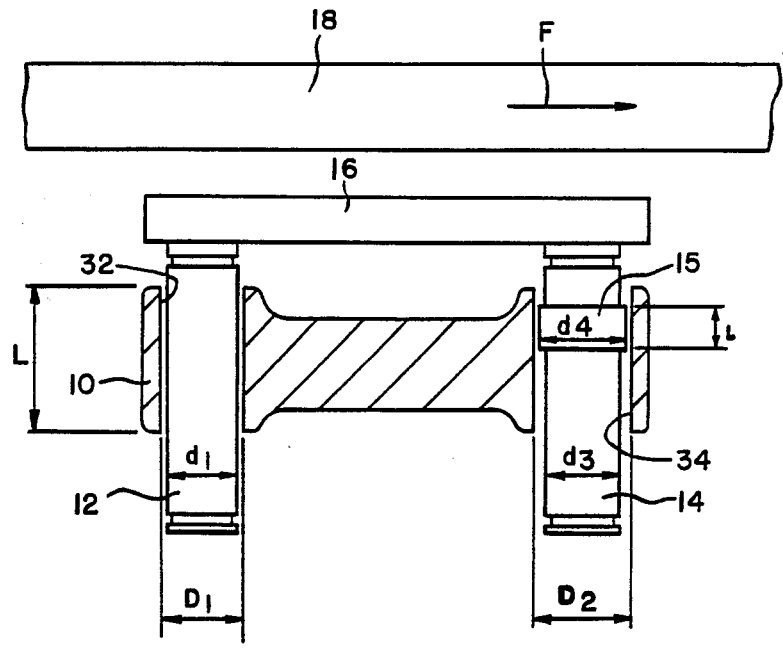
Figure 5:
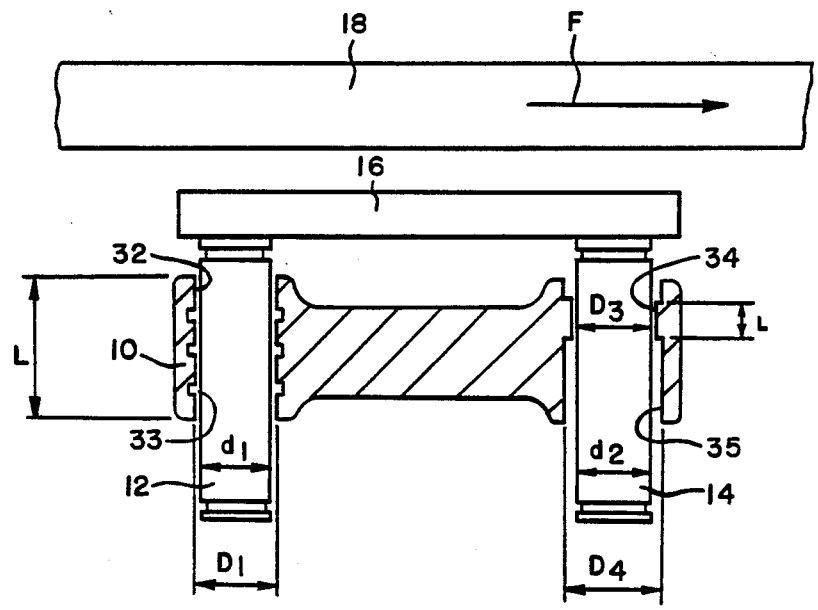

The invention will now be described by way of a non-limiting example with reference to the accompanying drawings in which:

FIG. 1 illustrates a front view of a disc brake produced according to the invention, FIG. 2 is a plan view of FIG. 1, FIG. 3 is a sectional view along the line 3—3 of FIG. 1, FIG. 4 illustrates the first embodiment, and FIG. 5 illustrates the second embodiment.

FIGS. 1 to 3 illustrate by way of example a disc brake comprising a caliper 10 mounted slidably by means of two columns 12 and 14 on a stationary part of the vehicle (not shown). The caliper 10 straddles the rotating disc 18 intended to be associated with the wheel of the vehicle. The caliper 10 has an orifice 20 in its part straddling the disc and performs the function of a torque-supporting member for two friction elements 22 and 24. The friction element 22 is actuated directly by the piston 26 of a brake monitor 28 associated with the caliper 10, while the friction element 24 is associated with the reaction part 29 of the caliper 10 in such a way that it is laid by reaction against the disc when the brake monitor 28 is operated, the latter forming the actuation means.

When the vehicle travels forward and the driver brakes, the piston 26 lays the friction element 22 against the disc 18, and the reaction element 29 lays the friction element 24 against the other face of the disc 18. The caliper consequently tends to be driven by the disc, the latter being offset relative to the columns, looking at FIG. 2. It follows from this that the assembly as a whole is subjected to a torque in a plane parallel to the axis of the disc and assumes a certain position of equilibrium.

To overcome these disadvantages, namely to reduce the rotation of the caliper when the latter is subjected to a torque, while at the same time allowing a normal mounting of the brake on a stationary support of the vehicle, according to the invention the system is made asymmetric by virtue of construction, contrary to the teaching of the prior art for this type of disc brake, where there is always only complete symmetry between the parts located at the torque input and the parts located at the torque output.

More specifically, according to the invention, the guide of the caliper on the column at the torque input is different from that of this caliper on the column at the torque output.

It will be reminded that, in the art, "torque input" generally refers to the brake part which the disc meets first during its rotation and "torque output" refers to the brake part which the disc leaves during its rotation. Thus, in FIGS. 4 and 5, with the disc 18 rotating in the direction of the arrow F, the column 12 is located at the torque input and the column 14 is located at the torque output.

It will also be reminded that a guide of one component on another varies according to sundry independent parameters, such as the length over which this guide is obtained, the play left between the components, etc. It is thus possible to obtain different guides for a given guide length if different plays are provided or for different guide lengths with identical plays. Consequently, "guide" will hereafter mean allowing one component, for example a caliper, to move relative to one or more other components, for example columns, over a certain length and/or with a certain play.

FIG. 4 shows a first embodiment of the invention. The same elements as described before, bearing the same reference numerals, are found there once again.

The asymmetry provided by the invention is in the guide of the caliper 10 on the columns 12 and 14. Whereas the guide lengths on the columns were traditionally always identical at the torque input and at the torque output, the invention recommends making these guide lengths unequal. More specifically, according to the invention, the guide length 1 on the caliper 10 on the column 14 located at the torque output is appreciably less than the guide length L of the caliper 10 on the column 12 located at the torque input.

Thus, the guide of the caliper 10 on the column 12 is obtained over the entire length L of the bore 32 made in the part of the torque input of the caliper 10, whereas it is obtained only over a part 1 of the length of the bore 34 made in the part of the torque output of the caliper 10. It will be seen from FIG. 4 that only some of the length of the bore 34 is used by means of a column 14 having, over a length 1 of its axis, a part 15 of diameter d4 slightly larger than the diameter d3 of the rest of the column. Thus, the guide of the caliper 10 in terms of translational movement perpendicular to the plane of the disc 18 is normally obtained on the column 12 and on the part 15 of the column 14.

Another embodiment of a guide length at the torque output less than the guide length at the torque input is illustrated in FIG. 5. Here, the guide is obtained over a length 1 of the torque output bore of the caliper 10 of diameter D3 less than the diameter D4 of the rest of this bore, the column 14 being cylindrical.

The additional advantage of this latter embodiment is that two identical columns are used, thus preventing any source of error during the mounting or maintenance of the brake.

It can be seen from comparison between FIGS. 4 and 5 that the location where the guide is obtained is not identical in both cases, although the results obtained are substantially identical. However, it was considered preferable to obtain the guide of the caliper 10 on the torque output column 14 as near as possible to the end of the latter which is fixed to the stationary support 16, that is to say according to the embodiment illustrated in FIG. 5.

It is clear that, as is presently practiced in the art, grooves or flutes 33 can be made in the bore 32 of the torque input, in order to make it easier for a lubricating fluid to pass through. There is no need for the grooves in the bore 34 since the guide length is reduced.

As a numerical example, it was found that a ratio L/1 between the guide lengths at the torque input and output of between 1.5 and 4 gave the best results, without these values being critical. For example, for a value L of 27.6 mm, a length 1 of between 7 and 18 mm can be selected.

The asymmetry provided by the invention can also be that the plays between the columns 12 and 14 and the bores 32 and 34 respectively are different. Whereas they are identical in the prior art, according to the invention the play between the column 14 (or its part 15) and the bore 34 at the torque output is greater than the play between the column 12 and the bore 32 at the torque input. This arrangement makes it possible to gain the greatest possible benefit from the preceding arrangement (where the guide lengths are unequal). In fact, the guide of the caliper 10 over a maximum length L with a somewhat small play on the column 12 at the torque input allows this caliper to execute its translational movement in order to take into account the wear of the friction elements by reducing the rotation of the brake, thus also reducing the disadvantages of the prior art which are mentioned in the introduction to the present description, while the guide of the caliper 10 over a reduced length 1 with a little greater play on the column 14 of the torque output allows this caliper to be mounted on this column jointly with the torque input column, despite the errors of parallel alignment which can exist between these columns at the time of assembly.

In FIGS. 4 and 5, play $J_E = D_1 - d_1$. In FIG. 4, play $J_S = D_2 - d_4$, and in FIG. 5, play $J_S = D_3 - d_2$.

As a numerical example, it was found that the ratio $J_S/J_E$ between the average play $J_S$ between the column 14 and the bore 34 of the torque output and the average play $J_E$ between the column 12 and the bore 32 of the torque input should be approximately 2, without this value being obligatory. There can be, for example:

at the torque input, $J_E = 0.0425$ mm.

at the torque output, $J_S = 0.1025$ mm.

The two embodiments of the invention which have just been described by way of non-limiting example can easily be modified or combined together, without thereby departing from the scope of the present invention. For example, the guide surface in the torque output bore can occupy any position whatever within this bore. Likewise, it is possible for the guide length of the caliper on the torque output column to be greater than the guide length of the caliper on the torque input column, and for the play between the bore and the torque output column to be less than the play between the bore and the torque input column.

I claim:

1. A disc brake for a motor vehicle, comprising a torque-supporting member with which is associated actuation means capable of urging at least one friction element against a rotating disc, said torque-supporting member being equipped with a first bore located at the torque input and with a second bore located at the torque output allowing the member to slide respectively on a first column located at the torque input and on a second column located at the torque output in a direction substantially perpendicular to a plane of the rotating disc, the columns being fixed to a stationary support, characterized in that guide lengths of the torque-supporting member on the first column and on the second column are different, and in that play left between the first column and the first bore and between the second column and the second bore are different, wherein the guide length of the torque-supporting member on the first column is greater than the guide length of the torque-supporting member on the second column.

2. The disc brake according to claim 1, wherein the guide length of the torque-supporting member on the second column is obtained over a length corresponding to a first part of the second column having a diameter slightly larger than that of a second part of the second column.

3. The disc brake according to claim 1, wherein the guide length of the torque-supporting member on the second column is obtained over a length corresponding to a first part of the second bore having a diameter slightly less than that of a second part of the second bore.

4. The disc brake according to claim 1, wherein the guide length of the torque-supporting member on the second column is obtained at an end of said second column which is fixed to the stationary support.

5. The disc brake according to claim 1, wherein the play left between the first column and the first bore is less than the play left between the second column and the second bore.

6. The disc brake according to claim 1, wherein diameters of the first and second bores are identical, while diameters of the first and second columns are different.

7. The disc brake according to claim 1, wherein diameters of the first and second bores are different, while diameters of the first and second columns are identical.

8. The support column for a disc brake according to claim 1, wherein a part of the guide length of the second column has a diameter which is slightly larger than that of another part of the second column, the torque-supporting member sliding on said part of the guide length.

* * * * *